(12) United States Patent
Pendergrass et al.

(10) Patent No.: US 9,083,418 B2
(45) Date of Patent: Jul. 14, 2015

(54) VERSATILE ANTENNA RECEIVED SIGNAL STRENGTH MEASUREMENT SYSTEM NOT AFFECTING ANTENNA PATTERN AND RECEIVER PERFORMANCE

(71) Applicants: Nixon A. Pendergrass, Nashville, IN (US); Gregory D. Hughes, Dale City, VA (US); David R. Emerson, Ellettsville, IN (US)

(72) Inventors: Nixon A. Pendergrass, Nashville, IN (US); Gregory D. Hughes, Dale City, VA (US); David R. Emerson, Ellettsville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 34 days.

(21) Appl. No.: 14/055,760

(22) Filed: Oct. 16, 2013

(65) Prior Publication Data
US 2014/0248845 A1   Sep. 4, 2014

Related U.S. Application Data

(60) Provisional application No. 61/714,374, filed on Oct. 16, 2012.

(51) Int. Cl.
*H04B 17/00* (2015.01)
*H04B 1/10* (2006.01)
*H03C 1/62* (2006.01)

(52) U.S. Cl.
CPC .................. *H04B 1/1027* (2013.01)

(58) Field of Classification Search
CPC .... H04B 17/24; G01R 31/001; G01R 31/002; H04W 24/10
USPC .................. 455/67.11, 226.1–226.4
See application file for complete search history.

(56) References Cited

U.S. PATENT DOCUMENTS

| 8,000,656 B1 * | 8/2011 | Jiao et al. .................... 455/67.11 |
| 9,000,989 B2 | 4/2015 | Nickel et al. |
| 2011/0237199 A1 * | 9/2011 | Venkataraman et al. .. 455/67.11 |

* cited by examiner

*Primary Examiner* — Lee Nguyen
(74) *Attorney, Agent, or Firm* — Christopher A. Monsey

(57) ABSTRACT

A system and method of manufacturing the same adapted for use with an electromagnetic receiver or transceiver system comprising at least one antenna, wherein the electromagnetic receiver or transceiver system is adapted to measure signal levels for in situ antenna pattern or link budget measurements using at least one signal measurement probe placed in the signal receive path without affecting said antenna's emission pattern or receiver performance. The system further includes an output section adapted to send results from said in situ antenna pattern or link budget measurements to a remote location away from said receiver or transceiver system for recording and/or analysis.

19 Claims, 3 Drawing Sheets

VERSATILE ANTENNA RECEIVED SIGNAL STRENGTH MEASUREMENT SYSTEM NOT AFFECTING ANTENNA PATTERN AND RECEIVER PERFORMANCE

CROSS-REFERENCE TO RELATED APPLICATIONS

The present application claims priority to U.S. Provisional Patent Application Ser. No. 61/714,374, filed Oct. 16, 2012, entitled "ANTENNA SIGNAL MEASUREMENT SYSTEM WITH INTERFERENCE REDUCTION," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY OF THE INVENTION

Some receivers with built-in antennas, for example those at lower cost, do not have Received Signal Strength Indication (RSSI) circuits built in. Even when present, most such RSSI circuits operate over a very limited range of signal levels and are designed to provide only a slow, crude indication of received signal level to the user. Therefore, unless a receiver has a high quality RSSI circuit built-in, the problem of determining the signal level at the actual receiver's antenna input without affecting the antenna is very difficult involving direct connection through wires in order to provide instrumentation. Even if an excellent RSSI circuit is present that is fast enough, its results again must be sent to outside instrumentation for recording and analysis. In any case, wired connection to things outside the receiver will likely change the antenna pattern and impedance unless aggressive, costly, non-portable, bulky, undesirable, equipment intensive and impractical steps are taken to minimize the impact and there will still be questions about accuracy. The need to make external wired connections seriously limits the trustworthiness and value of results as well as the types of real world situations that could be usefully evaluated.

With present methods and devices that try to measure antenna input signals with a receiver that has a built-in antenna, designers experience significant difficulty in making an accurate measurement of the signal actually received by the in-place antenna and then to track rapid changes. This lack of desired capability has been aggravated by the nature of many existing receivers. For example, commercially produced receivers are often very small and are located within oddly shaped plastic cases that may contain patches of conductive material. The case and its internal printed circuit boards are part of the antenna. Furthermore, many common receivers have limited dynamic range in any given stage because of noise as well as compressive, limiting, or other non-linear gain.

Experimentation was utilized as a prelude to creation of the invention. For example, two methods were attempted to make propagation anomaly and path loss measurements in realistic or rapidly changing situations from a transmitting source. A first method includes replacing an original or initially used antenna and receiver with a surrogate antenna/receiver box and cabling from the antenna/receiver to a remote instrumentation. The problem with this approach is that the antenna pattern likely does not correspond to the original signal; important observable metrics will be changed, including multipath and nearby object effects to the RF field. This method tends to produce repeatable and apparently consistent results, but the results do not accurately represent the true nature of the metrics being studied.

A second experimentation method was attempted entailing attaching a spectrum analyzer at the antenna input or further into the actual receiver. Even with this method, serious difficulties emerged from its use. An active instrumentation probe must be attached to the receiver to prevent loading of the antenna or circuitry. The attachment of an active probe would be difficult inside smaller receiver cases, such as cellphones. Furthermore, the analyzer or recording equipment required would need to be located some distance from the receiver and antenna to avoid an impact on the antenna pattern. This would require increased lengths of cable to connect to the spectrum analyzer, which will become part of the receiver's antenna system. This length of cable would add to the undesirable result of also changing the antenna pattern. Extensive and difficult steps can be taken to mitigate this undesirable effect, but it would be difficult to dispel suspicion that the cables have changed the pattern, or prove that they have not.

A receiver, which is part of a transceiver, could be adapted to incorporate an ability to report back signal level through the transmitter without requiring additional components to be added. These mechanisms can sometimes be quite accurate but have serious drawbacks such being too slow to track rapid changes in received power level due to propagation anomalies, transmitter/receiver motion, or other factors that such an attempted solution would entail.

The present invention relates to a signal measurement system which is adapted to address these and other shortcomings in existing technology. One embodiment of the invention can include a system adapted to remotely measure and rapidly track a signal level at an antenna input of a receiver with built-in antennas in a number of environments (e.g., when that receiver antenna is positioned on a top surface of an automobile, on a seat in a bus and in a subway tunnel are examples of such environments). Such measurement could be used to determine actual device antenna pattern, actual path loss, the impact of propagation anomalies, and other important measurable information in realistic situations well beyond artificial and costly laboratory environments.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Exemplary apparatuses and methods are provided to realize a signal measurement system related to antennas. One exemplary aspect of the invention includes a system adapted to remotely measure and rapidly track the signal level at the antenna input of a selected receiver with built-in antennas in any number of environments (e.g., when that receiver antenna is positioned on a top surface of an automobile, on a seat in a bus and in a subway tunnel). Measurements of the received signals, e.g., power level, at an antenna input of a selected receiver could be used to determine actual device antenna pattern, path loss, the impact of propagation anomalies, and other important diagnostic metrics in realistic situations well beyond artificial laboratory environments.

Figure 1:
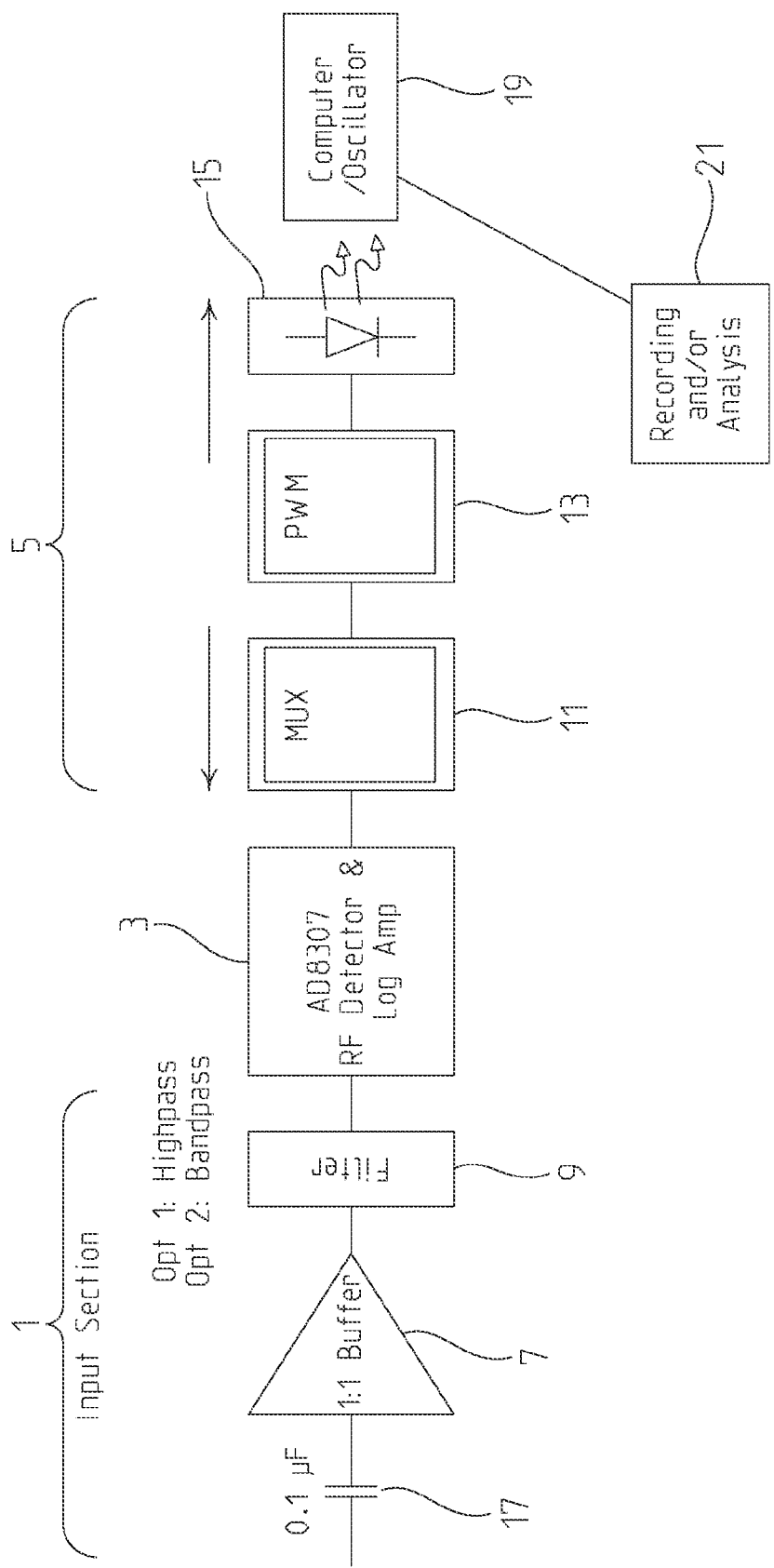
FIG. 1 shows a block diagram that includes an exemplary basic receiver signal level measuring probe located in various locations in accordance with one embodiment of the invention.

Referring initially to FIG. 1, a block diagram is shown with an exemplary basic receiver signal level measuring probe in accordance with one embodiment of the invention. One embodiment can entail creating an entire exemplary circuit on one board or it could be separated by function onto two or more boards to make placement convenient in a receiver. Input section 1 consists of a Capacitor 17, a Buffer 7, and may include a Low-pass/High-pass/Band-pass Filter 9. Input section 1 can be designed to offer sufficiently high impedance to not affect the receiver stage where it is connected. Exemplary input section 1 could be single ended or differential and passive or active as needed for minimal impact. Exemplary input section 1 may also include filtering to prevent unwanted signals from being introduced as part of a given measurement. An exemplary input section 1 (e.g., a Capacitor 17, Buffer 7, and Low-pass/High-pass/Band-pass Filter 9) can also provide desired or correct impedance and scaling for later stages or components in an exemplary embodiment of the invention. An output of the input section 1 can be level detected and logged in radio frequency (RF) detector and logarithmic amplifier (RFDLA) 3 to produce a voltage proportional to a log of an exemplary input signal level, e.g., power signal. RFDLA 3 can comprise an analog-to-digital converter.

Logged voltage out of RFDLA 3 is filtered and then converted in an input/output assembly 5 to, e.g., light pulses for transmission to a remote location over a fiber optic cable via a laser diode 15 or other means. Various mechanisms could be used to encode the logged output voltage into light. Exemplary input/output assembly 5 is comprised of a multiplexer (MUX) 11, a Pulse-Width-Modulation (PWM) section 13 (e.g. a voltage to frequency converter), and a Diode section 15. In an exemplary embodiment a PWM can be used to provide accelerated tracking of measured level changes. Multiple front-end sections 1, 3, and 5 may be multiplexed onto a single light beam.

Computers/oscilloscopes 19 or other various electronic means can then be used to convert the received light pulses to give the desired signal level result for use in a Recording and/or Analysis section 21.

Figure 2:
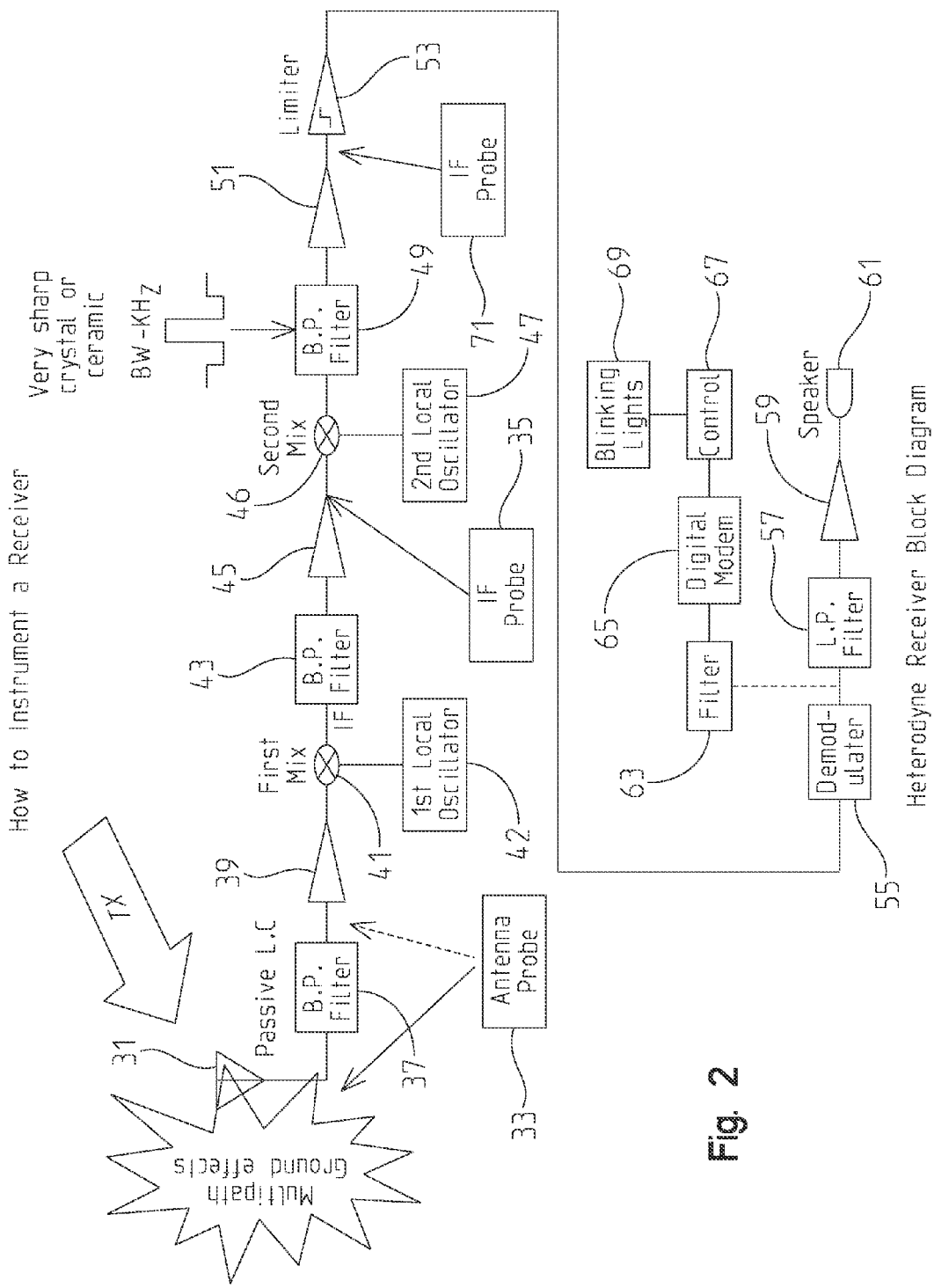
FIG. 2 shows an exemplary block diagram of an embodiment of the invention in a context of an exemplary double conversion heterodyned receiver for narrow amplitude modulation (AM) or frequency modulation (FM) voice grade reception.

Referring to FIG. 2, an exemplary block diagram of a double conversion heterodyned receiver for narrow amplitude modulation (AM) or frequency modulation (FM) voice grade reception. The FIG. 2 block diagram shows components in a receiver system coupled in sequence including an Antenna 31, a First Band-pass Filter 37 (connected to the Antenna 31), an Amplifier 39 (connected to the First Band-pass Filter 37), a First Mixer 41 (coupled to the Amplifier 39), a First Signal Oscillator 42 (coupled to the First Mixer 41), a Second Band-pass Filter 43 (coupled to the First Mixer 41), a Second Amplifier 45 (coupled to the Second Band-pass Filter 43), a Second Mixer 46 (coupled to the Second Amplifier 45), a Second Local Oscillator 47 (coupled to the Second Mixer 46), a Third Band-pass Filter 49 (coupled to the Second Mixer 46), a Third Amplifier 51 (coupled to the Third Band-pass Filter 49), a Fourth Amplifier With Limiter Function 53 (coupled to the Third Amplifier 51), a Demodulator 55 (coupled to the Fourth Amplifier with Limiter Function 53), a Low Pass Filter 57 (coupled to the Demodulator 55), a Fifth Amplifier 59 (coupled to the Low Pass Filter 57), an Output Device e.g., a Speaker 61, coupled to the Fifth Amplifier 59; an alternate path of output is also shown (depicted initially by a dashed line) e.g., digital output path, which can include Another Filter 63 (coupled to the Demodulator 55), a Digital Modem 65 (coupled to the Another Filter 63), a Control System 67 (coupled to the Digital Modem 65), and another output device, e.g., a Blinking Light Apparatus 69 (coupled to the Control System 67).

FIG. 2 shows one example of how to place one or more signal measuring system probes (e.g., Antenna Probe 33 and/or Intermediate Frequency (IF) probe 35) at one or multiple points to provide a wide dynamic range. One embodiment of the invention includes application of probes at probe points, e.g., IF probe points, within a device under which include sections of the device where an IF can be detected which can then be used in an analysis of device performance relative to energy received and processed by the device from a source. An example of IF is a case where a high frequency source is received by an antenna of a device under test which is then converted to a lower frequency in a signal path of a receiver train e.g., including mixers. Use of IF and IF probe points takes advantage of signal processing which is already being done within a transmitter/receiver thus enables simplification of an instrumentation package in one embodiment of the invention.

Exemplary receiver probe locations are noted at a first portion (e.g., an RF Probe 33 at signal path attached to Antenna 31 or at or at a signal path after the First Band-pass Filter 37), second portion (e.g., an IF Probe 35 on a signal path at or after Second Amplifier 45), and a third portion (e.g., IF Probe 71 on a signal path after the Third Amplifier 51) but particular locations actually used would be determined by the nature of the signals at the stage in question and e.g., structure of a system of interest. In general, the further a receiver probe is placed moving back along a signal path in the receiver, the less noise and spurious signals will be expected to be involved in measurements due to receiver filters and because more gain has been applied to boost a desired signal level.

Figure 3:
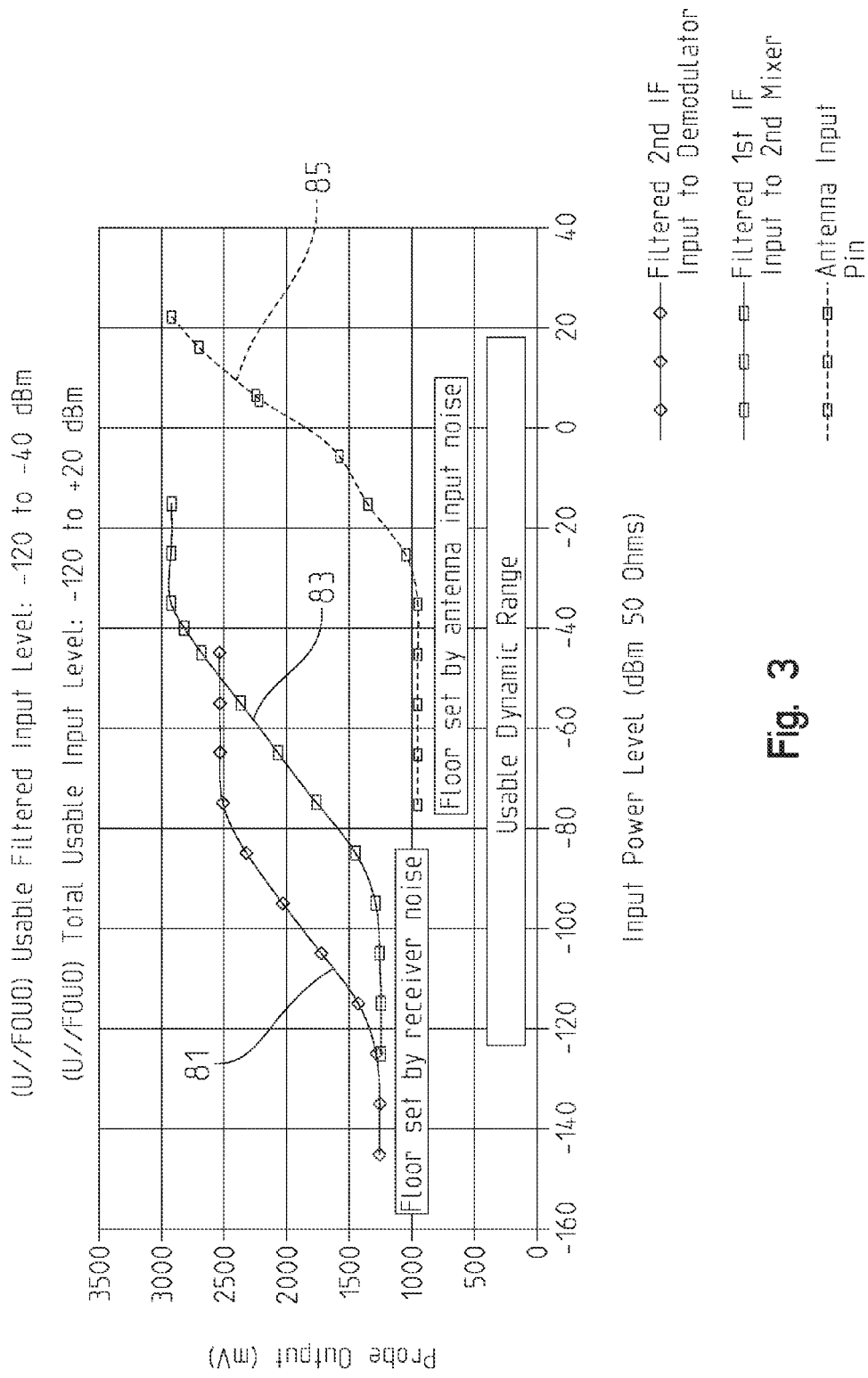
FIG. 3 shows actual measured outputs of receiver probes placed at points such as shown in FIG. 2.

FIG. 3 shows actual measured outputs of receiver probes placed at particular points within an exemplary FM receiver as, e.g., in FIG. 2. Each graph relates to a probe output voltage for a given input power. Graph 81 relates to a probe placed at position 71 in FIG. 2; Graph 83 relates to a probe placed at position 35 on FIG. 2; and Graph 85 relates to a probe placed at position 33 on FIG. 2. The x-axis in FIG. 3 is an input power in dBm (50 ohms) and the y-axis is probe output voltage in millivolts. A slope of each curve is approximately 25 mV per dB in the center portion away from the ends where gain compression was dominant.

A limited dynamic range of the 2nd IF probe is experimentally shown in FIG. 3. Including probes at the 1st IF 35 and another IF probe 33 near Antenna's 31 input terminal provides a more complete picture of signal levels over a wide dynamic range. Selection of probe connection points is one significant feature of an embodiment of the invention. Probe circuits are designed to be versatile and allow a wide range of locations to be chosen.

A method of manufacturing an embodiment in accordance with one example of the invention can include: Step 1: identify device to install a probe in accordance with an embodiment of the invention; Step 2: if device circuit board is not exposed, remove any coverings/protective casing; Step 3: identify the following locations for probe installation (if applicable - some devices may not have all three locations): 1) Antenna connection entry onto device PCB; 2) a First Intermediate Frequency (1st IF) point; 3) a Second Intermediate Frequency (2nd IF); Step 4: connect RF IN on the probe to the RF point on the device PCB and connect the FG ground to the closest ground point for each of the available locations; Step 5: Reassemble device outer casing, removing any necessary areas in order to allow the probes to fit. Complete.

If relative measurements are all that is required (such as when measuring antenna patterns, tracking propagation anomalies and signal dropouts, etc.,) probes could be used in a receiver with little or no calibration while inserted inside. Nonetheless, in most situations a complete calibration of the instrumented receiver will be required at each temperature where it will be used. Such calibration can be required given an actual gain and tuned frequency of each stage can vary from receiver to receiver and over temperature.

Once calibrated, a fully instrumented receiver becomes a powerful signal measurement and analysis device. An embodiment of the invention can be used to accurately measure and track signals received in remarkably difficult field settings; those actually found at the receiver's antenna input. The invention turns the receiver itself into its own measurement tool.

An embodiment of the invention produces precise, wide dynamic range, and fast responding measurement of the voltage produced by a built-in antenna at the input to almost any receiver. An embodiment of the invention produces such measurements by turning the receiver itself into an RF measuring device without significantly affecting the antenna or its pattern and without altering the receiver response. Because of this, the invention offers considerable advantages over previous methods and applications.

First, propagation anomaly and path loss measurement in realistic or rapidly changing situations is enhanced using an exemplary embodiment of the invention. An embodiment of the invention could be used to produce an accurate understanding of the path loss in real situations between a receiver and transmitter. Understanding path loss can be important to the development of link budgets for system design as well as for development of signal processing algorithms or circuits to mitigate the effects of propagation anomalies such as fast changing multipath nulls in a dynamic environment. Thus, measurement and rapid tracking features of an embodiment of the invention provides an ability to measure and rapidly track a signal of interest, e.g., power level, at an antenna input of a variety of selected receivers with built-in antennas when that receiver is placed in difficult physical situations such as by being hand-held, laying on the top of an automobile, being placed on a seat in a bus, or when located within a subway tunnel, etc.

The invention described herein provides accurate, rapidly responding measurement of the received signal without significantly affecting the receiver or its antenna pattern. Its output can be sent to remote locations hundreds of meters away for recording and analysis. Another advantage of an embodiment of the invention is providing a gain pattern measurement of built-in receiver antennas. Antenna pattern is very important in the design of a receiver when it is built-in because it determines the received signal level versus azimuth and elevation angle in a given RF field. This is critical because received signals must be sufficiently high relative to electronic noise for information to be transmitted. The antenna pattern, as noted above, is affected by the antenna's relationship with nearby objects, especially those that include conductive materials. As mentioned previously, the receiver's case and possibly the circuit board and anything attached to it are often important to the antenna pattern.

Several approaches can be used to conduct or perform an antenna pattern measurement when a receiver has a built-in antenna. One way entails transmitting a known signal on a reference antenna to the receiver antenna at a particular angle and measures the received signal at the antenna. A transmitter and antenna could be used for the source. The equipment may use a network analyzer in order to produce coordinated transmitter signals and received level measurements and to obtain phase information. An advantage of an exemplary embodiment of this invention includes providing signals measured inside the receiver without changing the signal or its antenna pattern and further enabling sending results to a remote location away from the transmitter and receiver for recording and analysis.

Alternatively, an antenna pattern test could reverse the signal path described above, e.g., transmit a known signal through the receiver antenna, bypassing the receiver. The resulting RF field at various angles is then measured precisely by a reference antenna to obtain the pattern.

There are several alternative uses of an embodiment of the invention. One such alternative use would allow remote measurement or monitoring of receiver performance to be performed in field settings. When a receiver is in place in a field setting and is equipped with the invention, receiver performance can be evaluated throughout the RF and IF structure of a receiver by providing simple RF test signals into the environment. For example, a simple test signal that is slowly swept across the receiver's passband would produce an output from the invention that accurately gives the log frequency response of the receiver passband. Similarly, if a constant or swept amplitude signal is transmitted in the center of the passband of the receiver, comparison of the output of the invention to previous results provides an accurate measure of the gain performance of the receiver.

Another alternative use includes performing a measurement of receiver characteristics versus temperature of other environmental conditions. An embodiment of the invention can measure a signal level and send the information to a remote location. By placing the invention at strategic points in the receiver, measurements of many important parameters can easily be made with the receiver inside an environmental chamber or other location where it is difficult to attach instrumentation in RF and IF stages. Strategic points can include points identified, e.g., in FIG. 2 which allow for insertion of probes or IF probes which sample signals at various points of signal path and which do not interfere or minimize interference with an antenna's performance or field (e.g.., how much energy received into a receiver from a source in different environments or orientations). Variations in gain, passband center, bandwidth and other parameters with environmental changes can be easily measured without exposing sensitive instrumentation to rough, potentially damaging conditions.

To summarize, one embodiment of the invention includes a system adapted to produce a transmitted signal for antenna pattern measurement, which is transmitted through the receiver's built-in antenna. Signals are measured inside the receiver without changing it or its antenna pattern and the results are sent to a remote location away from the transmitter and receiver for recording and/or analysis. The invention turns the receiver itself into its own measurement device in such a way that eliminates or minimizes interference with receiver operation relative to a source and results can be recorded or analyzed at a remote location Although the invention has been described in detail with reference to certain preferred embodiments, variations and modifications exist within the spirit and scope of the invention as described and defined in the following claims.

The invention claimed is:

1. A signal measurement system adapted for use with an electromagnetic receiver or transceiver system, comprising:
   a case;
   an electromagnetic (EM) receiver or transceiver system contained within the case adapted to receive at least one calibrated EM signal from at least one reference EM source, wherein said EM receiver or transceiver system contains and to perform signal processing on said calibrated EM signals;
   an at least one system antenna having an output coupled connected to said EM receiver or transceiver system's input circuitry adapted to have a first antenna pattern field;
   at least one signal measurement probe contained within the case, said at least one signal measurement probe is also coupled to a point within a signal path in said EM receiver or transceiver system and is adapted so as to minimize altering the at least one system antenna's first antenna field and the system's receiver performance, wherein said at least one signal measurement probe is adapted to sample output signals from said point within said signal path and produce antenna pattern measurement outputs comprising a system antenna pattern field or link budget measurements; and
   an output section adapted to send said antenna pattern measurement outputs to a remote location away from said receiver or transceiver for recording and analysis using a non-electrically conductive medium or a different EM spectrum than is received by said at least one system antenna.

2. A signal measurement system as in claim 1, further comprising at least one reference EM source that is adapted to emit at least one reference EM signal in a predetermined sequence of power levels and/or frequencies.

3. A signal measurement system as in claim 1, further comprising an analysis section adapted to remotely receive said antenna pattern field or link budget measurement outputs from said output section and generate an output data model comprising a plurality of analysis data related to data showing how the said EM receiver or transceiver system interacts with in situ EM environment surrounding said at least one system antenna.

4. A signal measurement system as in claim 3, wherein said plurality of output data model includes voltage data from at least one signal measurement probe and the reference EM signal data which can be used to create an output graph or result.

5. An EM receiver or transceiver system of claim 1, further comprising:
   a said signal measurement probe coupled to at least one said system antenna;
   a first band-pass filter;
   a first amplifier;
   a first mixer coupled to said first amplifier;
   a first local oscillator coupled to said first mixer;
   a second band-pass filter coupled to a second amplifier;
   a second mixer coupled to said second band-pass filter;
   a second local oscillator coupled to said second mixer;
   a third band-pass filter coupled to said second mixer;
   a third amplifier coupled to said third band-pass filter;
   an amplifier with limiter function coupled to said third amplifier;
   a demodulator coupled to said amplifier with limiter function;
   a low-pass filter coupled to said demodulator;
   a fourth amplifier coupled to said low-pass filter;
   a speaker coupled to said fourth amplifier;
   a fourth filter coupled to said demodulator;
   a digital modem coupled to said fourth filter;
   a control system coupled to said fourth filter;
   a blinking light apparatus coupled to said control system.

6. A signal measurement probe of claim 5, wherein said probe is located between said first bypass filter and said first amplifier.

7. A signal measurement probe of claim 5, wherein said probe is located between said second amplifier and said second local oscillator.

8. A signal measurement probe of claim 5, wherein said probe is located between said third amplifier and said amplifier with limiter function.

9. A signal measurement system as in claim 1, wherein said signal measurement probe is located at said signal path point at or after an output of said antenna.

10. A signal measurement system as in claim 1, further comprising an input section associated with said probe, an output section, a machine instruction processing section/oscilloscope section, an assembly section, and a recording and/or analysis section;
   wherein said input section further comprises a capacitor, a buffer, and a low-pass/high-pass/band-pass filter adapted to offer sufficiently high impedance to not affect the receiver's or transceiver's receiver stage where it is connected and apply filtering of unwanted signals from being introduced as part of a given measurement;
   wherein said output section further comprises a radio frequency detector and logarithmic amplifier (RFDLA) adapted to produce a voltage proportional to the log of an exemplary input signal level;
   wherein said assembly section further comprises a multiplexer, a pulse-width-modulation section comprising a voltage to frequency converter, and a diode adapted to convert logged voltage from said RFDLA to light pulses for transmission to a remote location;
   wherein said machine instruction processing section/oscilloscope section is adapted to convert received light pulses from said diode into an electronic signal;
   wherein said recording and/or analysis section is adapted to receive said electronic signal from said section/oscilloscope section.

11. The signal measurement system as in claim 1, wherein said signal measurement probe comprises a radio frequency (RF) probe.

12. The signal measurement system as in claim 1, wherein said signal measurement probe comprises an intermediate frequency (IF) probe.

13. A method of signal measurement adapted for use with an electromagnetic transceiver system including the steps of:
   transmitting electromagnetic signals from said transceiver;
   receiving a said signal transmission with the said transceiver;

transmitting said received signal transmission through attached probe adapted to process said transmission through input section of said probe consisting of a capacitor, buffer, and low-pass/high-pass/band-pass filter adapted to provide desired or correct impedance and scaling;

sending output from said input section to a radio frequency detector and logarithmic amplifier (RFDLA) adapted to produce a voltage proportional to the log of an exemplary input signal level;

sending output from said RFDLA to an assembly comprised of a multiplexer (MUX), a Pulse-Width-Modulation (PWM) comprised of a voltage to frequency converter, and a Diode adapted to transform the said output signal from said RFDLA into light pulses;

sending said light pulses to computers/oscilloscopes adapted to convert the received said light pulses to give the desired signal level result;

transmitting said desired signal to a remote location away from said transceiver adapted for recording and analysis of antenna pattern measurement.

14. A method of manufacturing a signal measurement system adapted for use with an electromagnetic transceiver system, comprising:

providing a case;

providing an electromagnetic transceiver system contained within the case adapted to receive at least one calibrated electromagnetic (EM) signal from at least one reference EM source and to perform signal processing on said calibrated EM signals;

providing an antenna having an output coupled to said transceiver adapted to have a first antenna field;

providing at least one signal measurement probe contained within the case, said at least one signal measurement probe is also coupled to a point within a signal path in said electromagnetic transceiver and is adapted so as to minimize altering the antenna's first antenna field, wherein said at least one signal measurement probe is adapted to sample output signals from said point within said signal path and produce antenna pattern measurement outputs; and providing an output section adapted to send antenna pattern measurement outputs to a remote location away from said transceiver for recording and analysis using a different EM spectrum than is received by said first antenna.

15. A method of manufacturing a signal measurement system as in claim 14, further comprising providing the reference EM source that is adapted to emit said calibrated EM signals and adjust said EM signals in a predetermined sequence of power levels at a given frequency.

16. A method of manufacturing a signal measurement system as in claim 14, further comprising providing an analysis section adapted to remotely receive said antenna pattern measurement outputs from said output section and generate an output data model comprising a plurality of analysis data related to data showing how the transceiver and the antenna interacts with their electromagnetic environment and factors that affect the electromagnetic environment.

17. A method of manufacturing a signal measurement system as in claim 16, wherein said plurality of output data model includes voltage data from the at least one signal measurement probe and the calibrated EM signal data which can be used to create an output graph or result.

18. A signal measurement system adapted for use with an electromagnetic (EM) receiver or transceiver system, comprising:

an EM receiver or transceiver system configured to receive at least one EM signal from at least one reference EM source, wherein said EM receiver or transceiver system contains at least one system antenna having an output connected to said EM receiver or transceiver system's input circuitry; and at least one signal measurement probe connected to a point within a receive signal path in said EM receiver or transceiver system, and is adapted so as to minimize altering the antenna pattern and receiver performance of the said EM receiver or transceiver system, wherein said signal measurement probe samples signals from said connection point to produce said EM system's in situ antenna pattern or link budget measurements;

wherein said signal measurement probe comprises an input section configured to isolate the said signal measurement probe from said EM receiver or transceiver system, minimizing or eliminating alterations to the said EM system's antenna pattern and receiver performance; a signal detection/measurement section operable to measure signal levels at the said connection point; and an output section operable for recording and/or analysis that is adapted to send said EM system's in situ antenna pattern or link budget measurements to a remote location away from said signal measurement system using at least one non-electrically-conductive medium or different EM spectrum than is received by said EM receiver or transceiver system.

19. A signal measurement system adapted for use with an electromagnetic (EM) receiver or transceiver system, comprising:

an EM receiver or transceiver system configured to receive at least one EM signal from at least one reference EM source, wherein said EM receiver or transceiver system contains at least one system antenna having an output connected to said EM receiver or transceiver system's input circuitry;

at least one signal measurement probe connected to a point within a receive signal path in said EM receiver or transceiver system, said at least one signal measurement probe is configured to minimize altering an antenna pattern of said at least one system antenna and receiver performance of the said EM receiver or transceiver system, wherein said measurement probe samples signals from said connection point to produce said EM system's antenna pattern or link budget measurements, wherein said signal measurement probe contains an output section configured for recording and analysis of inputs to said signal measurement probe that is adapted to send said EM system's antenna pattern or link budget measurements to a remote location away from said signal measurement system using at least one non-electrically-conductive medium or different EM spectrum than is received by said EM receiver or transceiver system.

* * * * *